United States Patent
Fang

(10) Patent No.: US 9,999,810 B2
(45) Date of Patent: Jun. 19, 2018

(54) BASEBALL/SOFTBALL AND METHOD OF PROCESSING THEREOF

(71) Applicant: XIAMEN ZAIFENG SPORTING EQUIPMENT CO., LTD., Xiamen, Fujian (CN)

(72) Inventor: Wenji Fang, Fujian (CN)

(73) Assignee: XIAMEN ZAIFENG SPORTING EQUIPMENT CO., LTD., Xiamen (CN)

( * ) Notice: Subject to any disclaimer, the term of this patent is extended or adjusted under 35 U.S.C. 154(b) by 0 days. days.

(21) Appl. No.: 15/632,411

(22) Filed: Jun. 26, 2017

(65) Prior Publication Data

US 2017/0291074 A1 Oct. 12, 2017

Related U.S. Application Data

(63) Continuation-in-part of application No. PCT/CN2015/000517, filed on Jul. 20, 2015.

(30) Foreign Application Priority Data

Dec. 26, 2014 (CN) .......................... 2014 1 0855914

(51) Int. Cl.
  A63B 37/12 (2006.01)
  A63B 45/02 (2006.01)
  B29C 35/02 (2006.01)

(52) U.S. Cl.
  CPC .............. *A63B 37/12* (2013.01); *A63B 45/02* (2013.01); *B29C 35/02* (2013.01); *A63B 2209/02* (2013.01)

(58) Field of Classification Search
  CPC ......... A63B 37/02; A63B 37/12; A63B 45/00; A63B 45/02; A63B 2209/02; B29C 35/02
  See application file for complete search history.

(56) References Cited

U.S. PATENT DOCUMENTS

| | | | | |
|---|---|---|---|---|
| 2,138,004 A | * | 11/1938 | Grau, Jr. ............ | B29D 99/0042 156/170 |
| 2,295,815 A | * | 9/1942 | Webb ..................... | A63B 41/08 273/DIG. 20 |
| 5,534,327 A | * | 7/1996 | Nishi ........................ | C08J 3/12 428/151 |
| 5,788,591 A | * | 8/1998 | Decker .................. | A63B 37/00 473/602 |
| 2001/0000507 A1 | * | 4/2001 | Uchida .................. | A63B 37/00 473/601 |
| 2003/0045384 A1 | * | 3/2003 | Yang ...................... | A63B 37/02 473/598 |
| 2003/0203778 A1 | * | 10/2003 | Huang ................... | A63B 37/12 473/598 |
| 2004/0029661 A1 | * | 2/2004 | Hung ..................... | A63B 37/12 473/598 |
| 2004/0142779 A1 | * | 7/2004 | Chan ...................... | A63B 37/12 473/600 |
| 2010/0086738 A1 | * | 4/2010 | Tanaka ................. | D06N 3/0004 428/151 |
| 2013/0210565 A1 | * | 8/2013 | Chen ..................... | B29C 44/588 473/598 |

FOREIGN PATENT DOCUMENTS

| | | |
|---|---|---|
| CN | 2928157 Y | 8/2007 |
| CN | 102553182 A | 7/2012 |
| CN | 202490383 U | 10/2012 |
| JP | 5757568 A | 4/1982 |

OTHER PUBLICATIONS

International Search Report of PCT Patent Application No. PCT/CN2015/000517 dated Oct. 26, 2015.
1st Office Action of counterpart Chinese Patent Application No. 201410855914.6 dated Aug. 29, 2016.

* cited by examiner

*Primary Examiner* — Steven Wong

(57) ABSTRACT

A baseball/softball comprises a core and a cover, wherein the core is wrapped with a layer of fiber material, and the layer of fiber material is wrapped and glued with the cover. A method of processing baseball/softball comprises wrapping the core with the layer of fiber material, placing the core and the layer of fiber material into a cover material, placing the core, the layer of fiber material outside the core and the layer of cover material outside the layer of fiber material into a mold; molding the layer of cover material into the cover through a vulcanization process, gluing a vulcanization melting layer formed on inner wall of the cover to the layer of fiber material, and finally taking the finished product out of the mold. From the perspectives of smell, touch and visual sense, the product has good simulation effect of baseball/softball and better service effect.

3 Claims, No Drawings

BASEBALL/SOFTBALL AND METHOD OF PROCESSING THEREOF

CROSS-REFERENCE TO RELATED APPLICATIONS

The present application is a continuation-in-part application of PCT application No. PCT/CN2015/000517 filed on Jul. 20, 2015 which claims the benefit of Chinese Patent Application No. 201410855914.6 filed on Dec. 26, 2014, the contents of which are hereby incorporated by reference.

TECHNICAL FIELD

The invention belongs to a ball sport apparatus, in particular to a baseball/softball.

BACKGROUND

The baseball/softball of the invention refers to a baseball or a softball.

Existing baseball/softball is wrapped with a PU (polyurethane) layer cover, and external layer of core is directly wrapped with PU material. Due to low coefficient of resilience, such material tends to deform. Once deformed or staved, it is hard to recover its shape. Further, lacking sticky feeling of cow leather, it feels slippery and results in poor gripping effect. With poor adhesion, the cover of the ball may be delaminated from the core after being batted. Moreover, the PU material has chemical smell rather than unique smell of cow leather, which has an overall impact on unique historical culture of traditional baseball/softball.

Existing processing technology of traditional baseball/softball includes leather cutting by a cutting die designed consistent with size of the core, and manual suturing. In peak season, it is not easy to employ mature workers. The low working efficiency of apprentices and high training costs may cause low yield. Thus, products may not be delivered on time.

SUMMARY OF THE INVENTION

The invention provides a baseball/softball for producing a more solid ball.

The invention also provides a method of processing baseball/softball for improving its yield and quality stability.

The invention further provides a material formula of a baseball/softball cover for achieving good adhesion between the core and the cover to avoid delamination, and similar feeling of the baseball/softball of leather material.

The objective of the invention is to improve service life, compression resistance, number of times against batting, COR and bounce coefficient of the baseball/softball.

The technical scheme used in the invention for solving the technical problem is as follows:

A baseball/softball includes a core and a cover, the core is independently molded and wrapped with a layer of fiber material, particularly, a layer of fiber material soaked with rubber, the layer of fiber material is wrapped and glued with the cover, wherein the layer of fiber material consists of more than one layer of wool and one layer or more of TR (polyester viscose blended) yarn outside the layer of wool; a cover material is made based on a formula comprising a rubber, a pulverized cow leather material, and a rubber vulcanizing agent, with a mixing and rubber breaking process, wherein the rubber vulcanizing agent contains a sulfur, a softening oil, a precipitated calcium carbonate or a ground calcium carbonate; the core, the layer of wool and the layer of TR (polyester viscose blended) yarn for wrapping the core are directly placed into the cover material after the mixing and rubber breaking of the cover material but before molding thereof, and into a mold together with the cover material for taking out of the mold along with the cover after high-temperature vulcanization.

The gluing process is realized by a vulcanization melting layer formed on an inner wall of the cover and glued to the layer of fiber material.

In terms of the gluing form, the method of processing the baseball/softball comprises wrapping the core with the layer of fiber material, placing the core and the layer of fiber material into the cover material after the mixing and rubber breaking of the cover material but before molding thereof, placing the core, the layer of fiber material outside the core and the layer of cover material outside the layer of fiber material into a mold; molding the layer of cover material into the cover through a vulcanization process, gluing the cover to the layer of fiber material by a vulcanization melting layer formed on an inner wall of the cover, and finally taking the finished product out of the mold.

The material formula of the cover of the baseball/softball is characterized by comprising at least a rubber and a pulverized cow leather.

The material formula further comprises a rubber vulcanizing agent containing a precipitated calcium carbonate or a ground calcium carbonate, a softening oil and a sulphur.

The benefits of the invention are as follows:

In a baseball/softball made according to the method of the invention, a layer of fiber material soaked with rubber is added to an independently formed core; thus, the cover and the core are more firmly fit during cover molding, and the porous structure in the fiber material can draw in air, greatly avoiding bubbles appeared in cover molding, thus improving quality and service life of the ball. For a cover made by wrapping the core with the mixed materials of rubber and pulverized cow leather by a formula, it feels more approximate to cow leather in smell and hand feel; moreover, based on simulation technique, unique sticky feeling and resilience force of rubber give the product the hand feel and functions (i.e., better resilience, pressure resistance and impact resistant times) of traditional baseball/softball. From the perspectives of smell, touch and visual sense, the product has good simulation effect of baseball/softball and better service effect.

DETAILED DESCRIPTION OF THE PREFERRED EMBODIMENT

The core of the baseball/softball can be selected from that made by prior art or independently molded from rubber, PU, wool and other materials according to different formula and processes.

With such fiber materials as wool and TR (polyester viscose blended) yarn, the core can be wrapped in multiple layers, in which these fibers are soaked with rubber and then wrapped around the core.

In order to allow the materials of rubber cover to obtain better simulation effect of cow leather in smell, hand feel and functions, the pulverized cow leather is added into the formula to give the cover material the smell of leather. When used as a filling material, it can alleviate weight of the cover and increase its occlusive action, hardness and stress. The formula consists of a rubber, a pulverized cow leather, a precipitated calcium carbonate or ground calcium carbonate, a sulfur, an oil and other rubber agents (dosage ratio and materials of the formula are adjusted according to changes in the weather to achieve a good shape, less bubbles, resistance to yellowing, anti-aging and other standard requirements for hardness and bounce).

One process of the invention comprises mixing and rubber breaking of the cover material, cutting and compressing the cover material into a small, flat piece of material according to the weight of the cover, and placing it into a mold for vulcanization molding at high temperature. The circumference and weight of the cover is adjusted according to the circumference and weight of the core. For example, the standard weight of a finished product is 145 g±3 g (i.e. 142-148 g), and the circumference of it is 8.75-9.25 in. If the core weighs 120 g, the cover should weigh 25 g±3 g. The circumference of the cover is determined in the same way. The temperature and time shall be adjusted according to the formula too.

A layer of viscose glue is applied to the layer of fiber material outside the core, and then it is arranged into two or more vulcanized covers. Standing a while, they are fused as a whole.

The process therefore produces a baseball/softball with the core wrapped with a layer of fiber material and the layer of fiber material wrapped and glued with a cover.

The invention provides another process, i.e. the core and the fiber layer outside the core are directly placed into the cover material, after mixing and rubber breaking of the cover material but before molding thereof, and into a mold together with the cover material for taking out of the mold along with the cover after high-temperature vulcanization.

The process produces a baseball/softball with the core wrapped with the layer of fiber material and the layer of fiber material wrapped with a cover, and with the vulcanization melting layer formed on inner wall of the cover glued to the layer of fiber material.

Finally, the cover is provided with traditional lines of leather baseball/softball and painted with the same number of suturing pattern.

Taking a successfully developed structure of a wool core with a cover as an example, a small rubber core of 34 mm (made from more than ten materials including rubber, precipitated calcium carbonate or ground calcium carbonate powder, sulfur and other rubber vulcanization additives, through mixing and breaking, cutting and vulcanization) has specific circular weight. After molding, the core is layered by rough and fine wools (commonly, inside rough wool+ outside fine wool, or three layers of fine wool, for wrapping the rubber core respectively to achieve pressure resistance, bounce coefficient, COR, impact-resistant property and anti-deformation that other finished products can have). After the core is wrapped with the wool yarn, it should be wrapped with one layer or more of TR (polyester viscose blended) yarn of different thickness (to form the outermost layer from the regulation layer for adjusting circumference and weight of the cover of the baseball/softball, and finally meet the standard requirements for the circumference and weight of the finished ball, including surface flatness). Most of the fiber material shall have high temperature resistance, high breaking strength, yarn twist, moisture content and other quality requirements. Meanwhile, the cover material is made based on a formula comprising a rubber, a pulverized cow leather material, precipitated calcium carbonate or ground calcium carbonate, a sulfur, a softening oil and other rubber vulcanizing agents, with a mixing and rubber breaking process. Then, the core, the wool layer and the TR (polyester viscose blended) yarn layer outside the core are directly placed into the cover material after the mixing and rubber breaking of the cover material but before molding thereof, and into a mold together with the cover material for taking out of the mold along with the cover after high-temperature vulcanization. The whole ball is therefore obtained. Finally, the cover is provided with traditional lines of leather baseball/softball and painted with the same number of suturing pattern.

The invention overcomes the comprehensive shortcomings of traditional baseball/softball (in artificial processing and quality control), and replaces manual stitching process and cover material (of traditional leather) with machine processing and (rubber material), thus changing the situation of extremely low production and difficult recruitment and training, improving yield and obtaining stable quality. In addition to high productivity, the processing obtains more stable product functions, and even enhances product quality and times of resistance to batting. Compared with the baseball/softball wrapped with PU material showing low coefficient of resilience, easy deformation, strong smell of chemical ingredients, non-sticky hand feel and low simulation, the formula combining rubber with pulverized cow leather ensures good adhesion and seizure property between the core and the cover in service to avoid delamination, and presents high simulation in smell, hand feel, bounce and more culture genes of baseball/softball.

In a baseball/softball made according to the method, the layer of fiber material soaked with rubber is added to the independent molded core, thus, the cover and the core are more firmly fit during cover molding; and the porous structure in the fiber material can draw in air, thereby greatly avoiding bubbles appeared in cover molding, thus improving quality and service life of the ball. Moreover, the frequency resistant to batting of the core without a layer of fiber material soaked with rubber is lower than the core to which a layer of fiber material soaked with rubber is added.

The invention claimed is:

1. A baseball/softball, comprising a core and a cover, wherein the core is independently molded and wrapped with a layer of fiber material soaked with rubber, the layer of fiber material is wrapped and glued with the cover, wherein the layer of fiber material consists of more than one layer of wool and one layer or more of TR (polyester viscose blended) yarn outside the layer of wool; a cover material is made based on a formula comprising a rubber, a pulverized cow leather material, and a rubber vulcanizing agent, with a mixing and rubber breaking process, wherein the rubber vulcanizing agent comprises a sulfur, a softening oil, a precipitated calcium carbonate or a ground calcium carbonate; the core, the layer of wool and the layer of TR yarn for wrapping the core are directly placed into the cover material after the mixing and rubber breaking of the cover material but before molding thereof, and into a mold together with the cover material for taking out of the mold along with the cover after high-temperature vulcanization; the gluing process is realized by a vulcanization melting layer formed on an inner wall of the cover and glued the cover to the layer of fiber material.

2. A method of processing the baseball/softball according to claim 1, comprising,
   wrapping the layer of fiber material outside the core;
   placing both the core and the layer of fiber material into the cover material after the mixing and rubber breaking of the cover material but before molding thereof;
   placing the core, the layer of fiber material outside the core and a layer of cover material outside the layer of fiber material into the mold;

molding the layer of cover material into the cover and gluing the cover to the layer of fiber material by the vulcanization melting layer formed on the inner wall of the cover through the vulcanization process; and taking the finished product out of the mold.

3. The baseball/softball according to claim 1, wherein the rubber vulcanizing agent contains a precipitated calcium carbonate or a ground calcium carbonate, a softening oil and a sulphur.

\* \* \* \* \*